United States Patent [19]

Henke

[11] Patent Number: 4,497,871
[45] Date of Patent: Feb. 5, 1985

[54] RECONSTITUTED LEATHER AND METHOD OF MANUFACTURING SAME

[76] Inventor: Edward W. Henke, 916 Woodshire La., St. Louis, Mo. 63141

[21] Appl. No.: 489,001

[22] Filed: Apr. 27, 1983

[51] Int. Cl.³ .................. B32B 9/02; B32B 25/02; B32B 25/12; B32B 31/26
[52] U.S. Cl. .................. 428/473; 156/62.2; 156/300; 427/209; 427/372.2; 428/151; 428/492; 428/904
[58] Field of Search .......... 428/473, 904, 492, 280, 428/218, 151, 411; 156/300, 62.2; 162/149; 427/209, 372.2

[56] References Cited

U.S. PATENT DOCUMENTS

| 52,737 | 2/1866 | Newhall | 428/904 X |
|---|---|---|---|
| 80,048 | 7/1868 | Allen | 428/904 X |
| 170,962 | 12/1875 | Nichols | 428/904 X |
| 258,057 | 5/1882 | Gunther | 428/904 X |
| 656,869 | 8/1900 | Walden | 428/904 X |
| 915,882 | 3/1909 | Pianko | 428/904 X |
| 1,269,905 | 6/1918 | Clapp | 428/280 X |
| 1,672,537 | 4/1922 | Novak | 428/218 |
| 1,677,125 | 7/1928 | Cook | 428/904 X |
| 1,750,231 | 3/1930 | Lifton | 428/904 X |
| 1,756,993 | 5/1930 | Rahr | 156/300 |
| 2,239,245 | 4/1941 | Oliner | 428/904 X |
| 2,383,598 | 8/1945 | Glidden | 428/411 |
| 3,297,514 | 1/1967 | Poeschl et al. | 162/149 X |
| 3,298,851 | 1/1967 | Fuchs | 428/151 |
| 4,251,587 | 2/1981 | Mimura et al. | 428/904 X |
| 4,287,252 | 9/1981 | Dimiter | 428/904 X |

Primary Examiner—T. J. Herbert, Jr.
Attorney, Agent, or Firm—Polster, Polster & Lucchesi

[57] ABSTRACT

A reconstituted leather product and a method of manufacturing this reconstituted leather product is disclosed in which leather (preferably scrap leather) is ground or shredded into a fibrous state. The fibrous leather is mixed with a binder, such as natural rubber dissolved in an evaporatable solvent (e.g., naphtha), so as to form a paste-like mix. The mix is then extruded (or otherwise formed) into sheets or webs and is cured so as to drive off excess solvent. A reinforcing mesh web may be adhered to the back face of the sheet or may be sandwiched between layers of the fibrous leather and binder. The cured reconstituted leather may be finished to have any desired surface finish or color in a manner similar to real leather. The resulting reconstituted leather closely resembles real leather in feel, color, finish, odor, strength, flexibility, and appearance, but is of much lower cost.

20 Claims, 3 Drawing Figures

RECONSTITUTED LEATHER AND METHOD OF MANUFACTURING SAME

BACKGROUND OF THE INVENTION

This invention relates to a reconstituted leather product and method of manufacturing reconstituted leather. More specifically, this invention relates to reconstituted leather and to a method of manufacture which utilizes scrap leather and other scrap material (e.g., scrap natural rubber) from the manufacture of leather goods (shoes) as its primary ingredients.

More generally, there has been a longstanding need to develop reconstituted leather utilizing leather scraps. Generally, prior efforts to manufacture reconstituted leather have employed the step of shredding scrap leather into a fibrous or powdered condition or have utilized synthetic fibers. Typically, a binder consisting of a gelatinaceous, vegetable, plastic, or asphalt material was utilized to form a slurry with the leather which was then formed into sheets or mats. Also, it was known that the matted material could be structurally reinforced by adhering reinforcing web of a suitable fabric to the back face of the material. Oftentimes, the reconstituted leather slurry was applied to a paper backing sheet or other semi-rigid material so as to afford sufficient strength to the material or to permit it to be formed in a desired configuration.

In many instances, however, the resulting reconstituted leather product did not emulate real leather in either appearance or feel. These prior reconstituted leather products had a synthetic or plastic feel to them, gave off plastic odors, and were oftentimes impervious to the transmission of air therethrough which, to a large degree, is particularly advantageous when the reconstituted leather product is utilized for shoe parts, articles of clothing, or upholstery fabric.

Reference may be made to such U.S. Pat. Nos. as: 52,737, 80,048, 170,962, 258,057, 656,869, 915,882, 1,269,905, 1,782,537, 1,677,125, 1,750,231, 1,757,993, 2,239,245, 2,383,598, 3,297,514, 3,298,851, and 4,287,252. These representative prior patents are in the same general field as the present invention.

Generally, reconstituted leather products suggested by the prior art have not been found entirely satisfactory because they differ from real leather in odor, feel, strength, and flexibility. Moreover, it has heretofore been difficult and expensive to attain a desired surface finish to both the finished face of prior reconstituted leather products and yet maintain a backside which is similar in appearance and feel to real leather. Still further, many of the prior art processes for manufacturing reconstituted leather required the user to take special steps to eliminate many of the chemicals present in tanned leather, such as chrome, alum, zinconium, and other chromatic salts which required special washing and leaching steps for the scrap, tanned leather prior to utilizing the leather in the manufacture of the reconstituted leather product.

Still other prior art processes required the leather to be ground into very fine particles, forming the particles into groups or globules, and then combining the globules of particles in an elastomerization process in which the binder was a material such as ethylene vinyl acetate copolymer, acrylate copolymer, acetoxylate polyethylene, or other polymeric binders.

SUMMARY OF THE INVENTION

Among the several objects and features of the present invention may be noted the provision of a reconstituted leather product and method of manufacturing the reconstituted leather product which utilizes scrap leather and other scrap materials normally formed in the production of leather goods, such as shoes, for the primary ingredients of the reconstituted leather product;

The provision of such a reconstituted leather product and method which does not require special chemical treatment of the scrap leather prior to utilizing the leather in the manufacture of the reconstituted leather product;

The provision of such a reconstituted leather product and method in which a solvent utilized in the formation of the binder is recoverable during a curing phase of the process and may be reused in the process;

The provision of such a reconstituted leather product and method which may be formed in a continuous operation;

The provision of such a reconstituted leather product and method in which a reinforcing web may be sandwiched between layers of the reconstituted leather so that one face of the reconstituted leather, constituting a finished face, has the appearance and feel of real leather and so that the other side of the reconstituted leather material has the general appearance and feel of the unfinished face of real leather without the reinforcing web being visible;

The provision of such a reconstituted leather product and method in which a variety of surface finishes may be applied to the leather product including smooth, sealed leather finishes and further including roughened or suede-like surface finishes;

The provision of a reconstituted leather product which emulates the feel, flexibility, thickness, formability, and smell of real leather, and yet which is of lower cost and which is available in uniform sheets or rolls thereby to minimize waste;

The provision of a reconstituted leather product and method in which a variety of surface finishes and textures can be applied to the finished face of the reconstituted leather product and in which the particles of fibrous scrap leather utilized in the reconstituted leather may vary considerably in size and consistency thereby to give a variety of non-uniform, non-repeatable surface finishes to the reconstituted leather product; and The provision of such a reconstituted leather product and method in which results in a reconstituted leather product of low price, high quality, and in a method which does not require undue capital investment.

Briefly stated, reconstituted leather of the present invention comprises a mass of fibrous leather and a binder, the binder comprising natural rubber and an evaporatable solvent capable of dissolving, at least in part, the natural rubber. The fibrous leather is mixed with the binder, and the binder and fibrous leather is then formed into a desired sheetlike form.

The method of manufacturing reconstituted leather of the present invention involves shredding or otherwise reducing a quantity of leather into a fibrous mass. A binder is then made comprised of natural rubber dissolved in a suitable, evaporatable solvent. The fibrous leather is mixed with the binder and a sheet of the fibrous leather and binder is formed. Then, the sheet is cured by evaporating the solvent from the leather and binder.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 3:
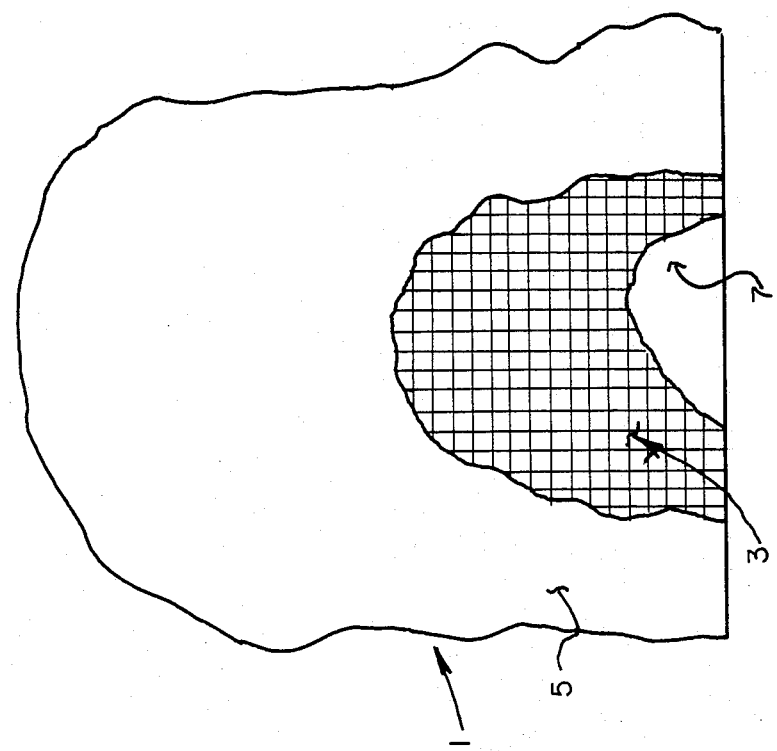
FIG. 3 is a partial plan view of a sheet of reconstituted leather of the present invention (with portions broken away) showing a sandwich construction with a web of reinforcing material interposed between layers of the reconstituted leather.

Referring now to the drawings, and particularly to FIG. 3, a portion of a reconstituted leather sheet-like material is illustrated in its entirety by reference character 1. As illustrated in FIG. 3, the reconstituted leather sheet 1 most usually, but not necessarily, has a sheet or web of reinforcing material 3 adhered thereto thereby to increase the tensile, impact, and burst strength of the reconstituted leather product. Reinforcing web 3 may be any type of fiber fabric, woven, or nonwoven material. As illustrated, reinforcing web 3 is a screen-like open mesh material of a plain weave pattern with the interlacement of the warp and filling strands. The mesh or opening size of the screen may vary considerably, depending on the application. Further, the material from which reinforcing mesh 3 is made may vary considerably from a fabric (e.g., cotton) screen to various synthetic resin screens including high tensile fibrous synthetic fiber materials such as nylon, or aramid fibers such as sold by Dupont under the trademark Kevlar.

Further referring to FIG. 3, reinforcing web 3 is shown to be sandwiched between a front or face layer 5 of the reconstituted leather product and a second or back layer 7 in such manner that the reinforcing web is not visible from either the front or the back face of reconstituted leather sheet 1. It will be understood that front face of the leather sheet may be finished to any desirable finish condition similar to real leather and may be dyed, coated with a wax solution, and sealed to achieve any number of desired surface finishes, in a manner much similar to real leather including high gloss finishes, satin finishes, or suede-like finishes. Typically, the back face of the bottom sheet 7 is left in an unfinished condition such that it has the appearance and feel of the back or unfinished face of real leather. Alternatively, the reinforcing web 3 may be applied to the back face of the reconstituted leather.

Figure 1:
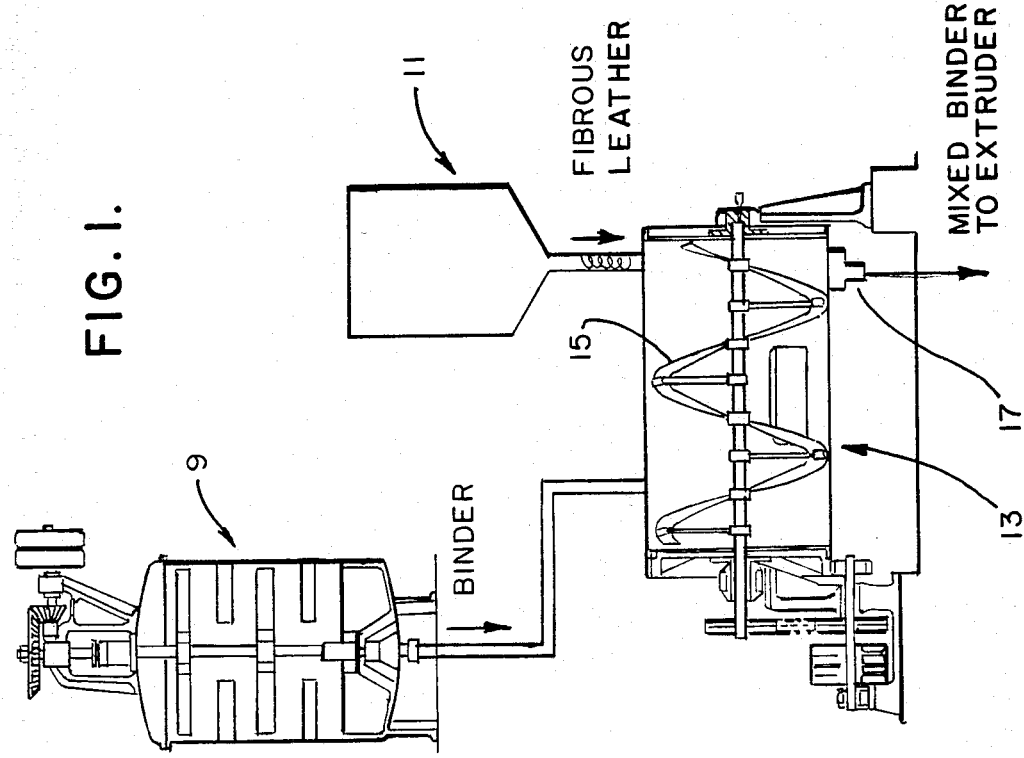
FIG. 1 is a semi-diagrammatic view of apparatus used to form a paste-like mix of fibrous leather and a binder with this paste-like mix being utilized to form reconstituted leather of the present invention.
Figure 2:
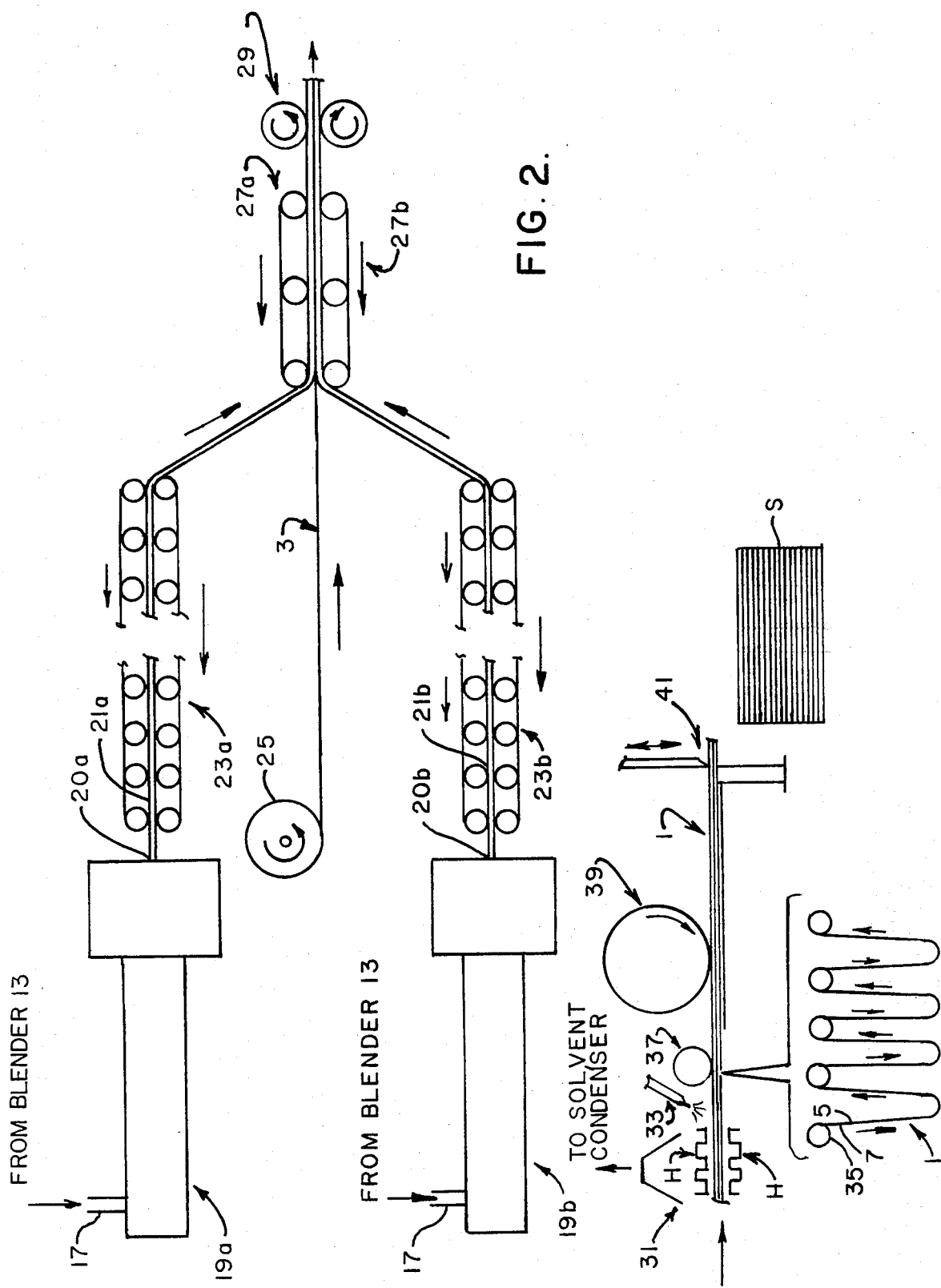
FIG. 2 is a semi-diagrammatic view of apparatus which receives the paste-like mix from the apparatus of FIG. 1, extrudes it into sheets, sandwiches a reinforcing web between the sheets, rolls the resulting sheet material to a desired thickness, cures the reconstituted leather, provides a surface finish for the reconstituted leather, and segments it into sheets for shipping or use.

Referring now to FIGS. 1 and 2, a more detailed description of the reconstituted leather product 1 and of a preferred method of making the reconstituted leather product will now be described. In general terms, the reconstituted leather product of the present invention is manufactured by shredding or grinding real leather, preferably scrap leather, into a fibrous mass. It will be understood that the particle size of the fibers of the fibrous leather material is not critical to the manufacture of the reconstituted leather product of the present invention. In fact, it may be desired that there be a wide degree of disparity between the size of the individual leather particles or fibers, and it may be preferable that relatively large globules of the fibrous leather remain, as opposed to a fine granular dust, such that the larger leather globules will remain substantially intact through the various mixing, extruding, and rolling steps of this method, as will be hereinafter more fully described, so as to result in a non-uniform, non-repeatable texture in the reconstituted leather which may, after finishing of the front face 5 of the reconstituted leather, take on the appearance of random blemishes or scars normally found in real leather. For example, it has been found that leather skivings as are conventionally produced in the manufacture of leather shoe soles may be utilized in the manufacture of the reconstituted leather product 1 of the present invention without further grinding or other processing. In other instances, if whole pieces of scrap leather are to be utilized in the process of manufacturing reconstituted leather of the present invention, it may be necessary to grind or shred the leather to a fibrous state in any one of a number of ways well known to those skilled in the leather art. It has been found that fibrous leather having particles up to 0.020 inches thick and 0.25 inches long may be used so long as these larger particles may be extruded in the manner as will hereinafter appear.

The second main constituent part of the reconstituted leather product of the present invention comprises a binder which is mixed with the fibrous leather so as to form a paste-like, extrudable mix. More specifically, the binder preferably is natural rubber dissolved in an evaporatable, aromatic hydrocarbon solvent, such as RSN naphtha. Even more particularly, the natural rubber may be crepe rubber scraps such as may be left over from the manufacture of crepe soles in the shoe industry, with the crepe rubber preferably being ground or pulverized to a particulate or crumb consistency.

As shown in FIG. 1, the natural rubber and the naphtha solvent are placed in an explosion proof mechanical mixer 9 and are mixed for a sufficient time such that the natural rubber is substantially dissolved by the naphtha solvent so as to form a liquid binder. Further, the fibrous leather material is held in a hopper 11 and a predetermined quantity of the fibrous leather from hopper 11 and a predetermined quantity of the binder from mixer 9 are introduced into a ribbon blender, as generally indicated at 13. Preferably, the ribbon blender is also explosion proof and it includes a powered mixing auger 15 for uniformly mixing the fibrous leather with the binder so as to form an extrudable, paste-like mix of the binder and the fibrous leather. For example, the binder may be constituted by a rubber/naphtha solution comprising about 5–30 parts rubber and about 95–70 parts RSN naphtha by weight. It will be understood that it may take some considerable length of time to dissolve the natural rubber in the naphtha solvent and thus it must be necessary, in some instances, to mix the rubber with the solvent up to 24 hours in advance of the time the binder will be utilized.

Further, the fibrous leather material is mixed with the binder in ribbon blender 13 at a ratio ranging between about 1–2 parts of binder for each part of fibrous leather material by weight. The ribbon blender is operated for a sufficient time so as to form a uniform consistency of the binder/fibrous leather mixture. The resulting paste-like binder/fibrous leather material is discharged from the ribbon blender 13 via a discharge port 17 to the extruding apparatus illustrated in FIG. 2.

More specifically, the extruding apparatus is shown, in FIG. 2, to comprise two independent extruding machines, as indicated generally at 19a, 19b. Typically, these extruders include a power auger or screw which forceably discharges the binder/fibrous leather paste under pressure into a manifold assembly which includes an appropriate extrusion die 20a, 20b for respectively extruding a continuous web 21a, 21b of the paste-like binder/fibrous leather material at a predetermined thickness and web width. For example, the thickness of the fibrous leather/binder material may be 1/16th inch (1.6 mm.) thick and the width of the web may be any conventional size, such as 48 or 54 inches (121.9 or 137 cm.). The construction and operation of the extrusion apparatus 19a, 19b shown in FIG. 2 is well known to those skilled in the extrusion art and any number of commercially available extruding machines may be utilized. It will be particularly noted that it is not important that extremely high extrusion pressures be generated by the extrusion apparatus nor is it necessary to heat the extrusion dies or the extrusion screws so as to keep the binder/fibrous resin paste-like material in a flowable, extrudable form.

Further referring to FIG. 2, it will be noted that the upper and lower extrusion apparatus 19a, 19b, respectively, are shown as two separate, independent extrusion apparatus. However, it will be understood that a single extrusion apparatus having two different extrusion manifolds and dies for continuously and simultaneously extruding upper web 21a and lower web 21b may be utilized.

As the extruded webs 21a, 21b exit the extrusion dies of extruding apparatus 19a, 19b, it will be understood that the webs are unstable and are in a sticky, uncured condition. The extruded webs have little or no structural strength or dimensional stability and thus the webs 21a, 21b are supported on respective continuously moving conveyor belts 23a, 23b for a distance sufficient to permit at least partial curing of the extruded webs. It will be understood that curing is a term utilized to indicate that the evaporable solvent (e.g., the RSN naphtha) is at least in part evaporated from the extruded webs. The conveyor belts of conveyors 23a, 23b may be preferably formed of a suitable synthetic resin belting material which does not adhere to the "as extruded" webs 21a, 21b. For example, a suitable polyvinyl chloride or fluorocarbon (Teflon) coating may be used on the belting which has desired mold release properties such that the "as extruded" reconstituted leather product does not stick to the belts, after at least partial curing has occurred. Further, it will be appreciated that the belts may be of a formacious construction such that drying air can be circulated through the belt so as to facilitate drying or curing of at least part of the solvent from the faces of the extruded webs 21a, 21b resting on the conveyor belts. Further, it will be understood that conveyor belts 23a, 23b are driven in synchronous speed with the rate or speed at which the webs 21a, 21b are extruded such that the webs are supported on the conveyor belts without substantial elongation or compression of the extruded webs.

For example, the as extruded webs 21a, 21b may be supported on their respective conveyors 23a, 23b for a period ranging between about one and five minutes, depending on whether ambient air drying only or whether forced, heated drying is utilized to initiate at least the partial curing or evaporation of the solvent from the binder thereby to form a "skin" on the outer surfaces of the as extruded webs 21a, 21b. As the partially cured webs exit the conveyors 23a, 23b, the webs will be "dry" to the touch on their outer surfaces, but curing of the interior of the webs will not yet be complete.

As further shown in FIG. 2, webs 21a, 21b from conveyors 23a, 23b are brought together and sandwiched or laminated on the outer faces of a continuous reinforcing web 3 which is unrolled from a roll 25 and fed between the webs 21a, 21b. Even more specifically, the extruded webs 21a, 21b are forceably pressed together on reinforcing web 3 by means of upper and lower platen conveyors 27a, 27b and by means of power rollers 29 so as to force the reinforcing webbing or screen into intimate contact with webs 21a, 21b and so as to force the uncured portions of the extruded webs into the spaces of the reinforcing mesh and so as to adhesively bond the partially uncured extruded webs 21a, 21b to one another and so as to substantially totally encase reinforcing web 3 between the extruded webs 21a, 21b. Power rollers 29 even more positively force the two webs into integral contact with one another through the openings of the reinforcing web and reduce the thickness of webs 21a, 21b and reinforcing web 3 to a predetermined thickness. Platen conveyors 27a, 27b may be heated to a relatively low elevated temperature (e.g., about 140° F.) to enhance curing.

The laminated web is then conveyed to a curing station 31 in which the web may be heated by any suitable manner, such as by radiant heaters H, radio frequency energy, or by forceably circulating heated air over the curing web thereby to evaporate and drive off the naphtha solvent. It will be appreciated that the evaporated naphtha solvent can be recovered at any point along the path of the web from the extruding dies 20a, 20b and the air transporting the solvent vapor may be circulated through a suitable refrigerated, condensing unit 31 such that a major portion of the solvent may be reclaimed for future use in forming the binder. Also, by reclaiming the evaporated solvent, air pollution problems are minimized.

After the laminated web has been cured, suitable finishing dyes and waxes may be applied (sprayed) on the finished face 5 of the laminated web, as indicated at 33 in FIG. 2. It will be appreciated that a wide variety of finishing chemicals and dyes may be utilized to treat the finished face 5 of the reconstituted leather web, depending on the color and surface finish desired. However, one example of a suitable finishing material may be a conventional shoe polish liquid wax which is sprayed on face 5 of the web so as to dye the web to a desired color and so as to provide a desired finish. Additionally, oversprays or sealers may be applied to the finished face 5 in a manner well known to those skilled in the leather finishing art so as to seal and protect the finished face of the web in a manner similar to natural leather.

Downstream from finishing applying wax-dye nozzles 33, the web may optionally be trained around a plurality of power rollers 35 in such manner that the outer face 5 of web 1 is not contacted by the rollers thereby to permit the finish to properly dry.

After the finishing materials have been properly dried, other wax/dye materials may be applied by rotary brushes 37 and then rotary polishing brushes 39 may be utilized to buff the finished face 5 of web 1 to a desired finish. After the web 1 has been finished as above-described, it may be segmented by a sheet cutter 41 to form sheets S of predetermined size or, web 1 may be wound into rolls (not shown).

EXAMPLE

A sample sheet of reconstituted leather 1 made in accordance with this invention was fabricated in which the binder comprised a 20% crepe rubber, and 80% RSN naphtha by volume. The rubber was allowed to soak and to be mixed with the naphtha for a period of about 24 hours. The binder was mixed with a fibrous leather material which had been designated as scrap in an "as received" condition wherein the leather had been skived or shaved from leather shoe soles during the manufacture of shoes. No other treatment was given to the fibrous leather and the fibrous leather did include some relatively large globules or chunks of fibrous, but still connected pieces of leather. Additionally, fine particulate fibers were present in the fibrous material. The binder was mixed with the fibrous leather material in the ratio of about 2 parts binder to one part fibrous leather by weight and the binder and fibrous leather were mixed to form a uniform paste-like material.

A first layer of the paste-like material was applied to a smooth mold release surface, such as a polyvinyl chloride belt, and was smoothed by hand to a generally uniform thickness of about 1/16th inch (1.6 mm.) so as to form the back layer 7 of the reconstituted leather sheet 1. Then, a layer of fabric reinforcement material 3 was laid on top of the first layer of paste-like binder/reconstituted leather. This reinforcing web 3 was a plain weave open mesh fiber glass screen with strands 0.002" thick and opening size of 1/16". Then, another layer of the binder/reconstituted leather paste was spread on top of the reinforcing web 3 to a uniform thickness so as to form to layer 5 such that the overall thickness of the bottom layer 7, the reinforcing web 3, and the top layer 5 was slightly greater than 1/8th inch (3.2 mm.).

After permitting the above-described web construction to air dry for approximately 2-5 minutes, a roller was passed over the laid up layers and reinforcing web so as to insure that the yet uncured portions of the binder/reconstituted leather product was forced into the openings of reinforcing web 3 and so as to insure that the upper and lower layers 5 and 7 comingled with one another and intimately bonded with one another thereby to totally encapsulate and to bond the reinforcing web 3 in laminated position between the two layers. The resulting sheet material was then allowed to air dry until substantially all of the naphtha was evaporated such that the resulting, cured sheet had no appreciable residual naphtha odor. The front face of the sheet was dyed with a liquid dye/wax shoe polish, such as shoe polish commercially available under the trademark KIWI, and was buffed to a desired finish. The back face of the sheet was left untreated without any finishing or sealing material being applied thereto.

The resulting sheet had a weight of approximately 5 ozs. per sq. ft. (142 grams/sq. m), and was approximately 1/10" inches (2.5 mm.) thick.

This sample was then tested against a piece of real leather by performing the following tests: Taber abrasion, Bally flex test, tear strength (pant leg), tensile strength (with ½ inch dumbbell), and the Mullen bursting strength. Generally, the results of these tests on this sample are shown in Table I below and are compared with a sample of real leather.

TABLE I

| | TABER ABRASION % of finish removed | BALLY FLEX No. of flexes when cracking occurred. | TEAR STRENGTH (pantleg) # of pull | TENSILE STRENGTH (with 2½" dumbell #/in. | MULLEN BURSTING STRENGTH # of pressure |
|---|---|---|---|---|---|
| Real Leather | 60% | OK (at 3000) | 4 | 1415.39 | 275 |
| Reconstituted Leather | 60% | 3000 | 3.2 | 1294.74 | 110 |

It will be appreciated that the tensile strength, tear strength, and bursting strength of the reconstituted leather product 1 of this invention are dependent, to a high degree, on the properties of reinforcing web 3 laminated within the reconstituted leather or adhered to the back face thereof. Thus, the results of these properties change can be selectively modified by judiciously selecting the strength characteristics of the reinforcing web. It will be understood that other tests with other samples of the reconstituted leather product of the present invention did not produce results as good as those set out in Table I.

A variety of sample leather goods articles, including a variety of conventional billfold designs, have fabricated from tests samples of the reconstituted leather product 1 of the present invention. These leather goods samples demonstrated that the reconstituted leather of the present invention can be readily cut on existing leather dies, that it can be formed and sewn in a manner similar to real leather, and that the reconstituted leather of the present invention may be bent on an extremely sharp radius, as in forming an edge seam on a billfold, without cracking.

In view of the above, it will be seen that the other objects of this invention are achieved and other advantageous results obtained.

As various changes could be made in the above constructions or methods without departing from the scope of the invention, it is intended that all matter contained in the above description or shown in the accompanying drawing shall be interpreted as illustrative and not in a limiting sense.

I claim:

1. Reconstituted leather comprising a mass of fibrous leather and a binder, said binder comprising natural rubber and an evaporatable solvent capable of dissolving, at least in part, said natural rubber, said fibrous leather being mixed with said binder, and said binder and said fibrous leather being formed into a desired sheet-like form, said solvent being an aromatic hydrocarbon liquid solvent, with the ratio of natural rubber to liquid solvent ranging between about 5-30 parts rubber to about 95-70 parts solvent, by volume.

2. Reconstituted leather as set forth in claim 1 wherein said rubber is ground-up rubber scrap from crepe shoe soles.

3. Reconstituted leather as set forth in claim 1 further comprising a reinforcing web adhered to said binder and said fibrous leather.

4. Reconstituted leather as set forth in claim 3 wherein said reinforcing web is a screen-like material pressed into said fibrous leather and said binder before the complete curing thereof such that said fibrous leather and binder fills the spaces within said screen-like web.

5. Reconstituted leather as set forth in claim 4 wherein said sheet-like reconstituted leather has a first layer of fibrous leather and binder on one face of said reinforcing web and another layer of fibrous leather and binder on the other face of said reinforcing web with the layers on opposite sides of the reinforcing web joining with one another prior to the complete curing thereof thereby to bond the layers to one another and to securely adhere the reinforcing web to the layers.

6. Reconstituted leather comprising a mass of fibrous leather and a binder, said binder comprising natural rubber and an evaporatable solvent capable of dissolving, at least in part, said natural rubber, said fibrous leather being mixed with said binder, and said binder and said fibrous leather being formed into a desired sheet-like form, one face of said sheet-like form constituting a finished face and being dyed and finished to a desired color and texture.

7. Reconstituted leather as set forth in claim 6 wherein said finished face of said sheet-like form is coated with a suitable sealer.

8. Reconstituted leather comprising a mass of fibrous leather, a binder, and a reinforcement web, said binder comprising crumb or particulate natural rubber mixed with a naphtha solvent at a ratio of about 5-30 parts rubber to about 95-70 parts naphtha by volume, said fibrous leather being mixed with said binder at a ratio ranging between about 1-2 parts binder for each part of said fibrous leather by weight to form a paste-like fibrous leather/binder mix, said mix being formed into a sheet, said reinforcement web being adhered to said sheet.

9. Reconstituted leather as set forth in claim 8 wherein said reinforcement web is laminated between a first and a second layer of said paste-like fibrous leather/binder mix.

10. A method of manufacturing a reconstituted leather comprising the steps of:
shredding a quantity of leather into a fibrous mass;
making a binder comprised of natural rubber dissolved, at least in part, in a an aromatic hydrocarbon solvent;
mixing said fibrous leather with said binder;
forming a sheet of said fibrous leather and said binder; and
curing said sheet by evaporating said solvent therefrom.

11. The method of claim 10 wherein said fibrous leather is mixed with said binder at a ratio of about 1-2 parts binder for each part fibrous leather by weight.

12. The method of claim 10 further comprising the step of collecting the evaporated solvent evaporated from the fibrous leather/binder sheet and condensing the reclaimed solvent for reuse.

13. The method of claim 10 wherein said solvent is naptha.

14. The method of claim 11 further comprising extruding said mixed fibrous leather/binder to form said sheet.

15. The method of claim 14 further comprising adhering a web of reinforcing material to said sheet.

16. The method of claim 15 wherein said sheet is heated during curing thereby to speed the curing of the reconstituted leather.

17. The method of claim 15 wherein, before said sheet is fully cured, said reinforcing web is pressed into said fibrous leather/binder sheet whereby said fibrous leather/binder flows into the spaces within said reinforcing web.

18. The method of claim 17 further comprising a first and a second sheet of said fibrous leather/binder and sandwiching said reinforcing web therebetween.

19. A method of manufacturing a reconstituted leather comprising the steps of:
shredding a quantity of leather into a fibrous mass;
making a binder comprised of natural rubber dissolved at least in part in a suitable evaporatable solvent, said rubber being mixed with said solvent at a ratio of about 5-30 parts rubber to about 95-70 parts solvent, by volume;
mixing said fibrous leather with said binder;
forming a sheet of said fibrous leather and said binder; and
curing said sheet by evaporating said solvent therefrom.

20. A method of manufacturing a reconstituted leather comprising the steps of:
shredding a quantity of leather into a fibrous mass;
making a binder comprised of natural rubber dissolved at least in part in naptha, said rubber being mixed with said naptha at a ratio of about 5-30 parts rubber to about 95-70 parts naptha, by volume;
mixing said fibrous leather with said binder;
forming a sheet of said fibrous leather and said binder; and
curing said sheet by evaporating said naptha therefrom.

* * * * *